United States Patent Office.

CALVIN CARPENTER, JR., OF ASTORIA, NEW YORK, ASSIGNOR TO H. H. WOLCOTT, OF NEW YORK CITY.

Letters Patent No. 82,083, dated September 15, 1868.

IMPROVED LUBRICATING-MATERIAL.

*The Schedule referred to in these Letters Patent and making part of the same.*

TO ALL WHOM IT MAY CONCERN:

Be it known that I, CALVIN CARPENTER, Jr., of Astoria, county of Queens, State of New York, have invented a new and improved Lubricating-Material; and I do hereby declare that the following is a full, clear, and exact description thereof, which will enable those skilled in the art to make and use the same.

This invention relates to a lubricating-material which is produced by putting crude petroleum in an open tank or cistern, setting fire to it, and allowing it to burn until all the light constituents of the petroleum are consumed, and a residuum is obtained, of superior lubricating-properties.

The separation of the light constituents of the crude petroleum from its heavy parts may be facilitated by floating the crude oil on water, and passing a current of air or steam through it from below.

If crude petroleum is placed in an open tank or cistern, and ignited, the light constituents of the oil burn off, and by the heat thus created, and by the agitation which necessarily takes place as the light parts disengage themselves from the heavy parts, said heavy parts are thoroughly mixed and united, and a cheap and superior lubricating-material is obtained.

If the crude oil is floated on water while being burned, the impurities contained therein have a chance to settle down and separate themselves from the lubricating-material.

In some cases, I have found it to be of advantage to pass a current of air or superheated steam through the body of the crude oil, for the purpose of facilitating the separation of the light constituents from the heavy parts of the oil.

In order to keep the body of the oil at the lowest possible temperature during the process of burning off the light constituents, I surround the oil-cisterns with jackets containing cold water, as described in Letters Patent granted to me, February 11, 1868.

The lubricating-material produced by my process is superior to that produced by distillation in the ordinary manner, for the following reasons:

In distilling petroleum, the whole body of the oil is necessarily heated to a very high temperature, and some portions of the oil are unavoidably charred. These charred particles float in the residuum, and, when the residuum is used for lubricating purposes, they cut into the wearing-surfaces and cause much injury.

In my process, the body of the oil is kept comparatively cool, and the temperature thereof never rises to such a degree that any portion of the oil becomes charred. The lubricating-material obtained by my process is, therefore, perfectly free from all charred particles, and it can be used with good effect for all kinds of machinery.

What I claim as new, and desire to secure by Letters Patent, is—

A lubricating-material prepared from crude petroleum, in the manner above set forth.

CALVIN CARPENTER, JR.

Witnesses:
JOHN C. POLLER,
W. HAUFF.